Figure 1:
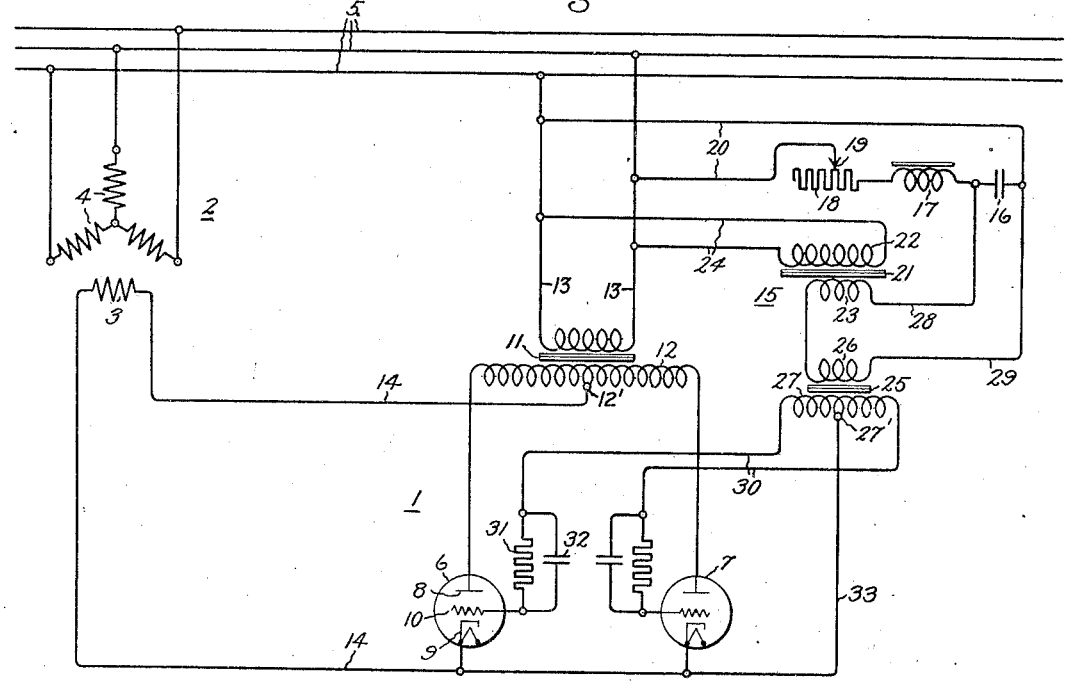

June 29, 1937.  H. W. LORD  2,085,596

ELECTRIC CONTROL SYSTEM

Filed Jan. 2, 1936  2 Sheets-Sheet 1

Inventor:
Harold W. Lord,
by Harry E. Dunham
His Attorney.

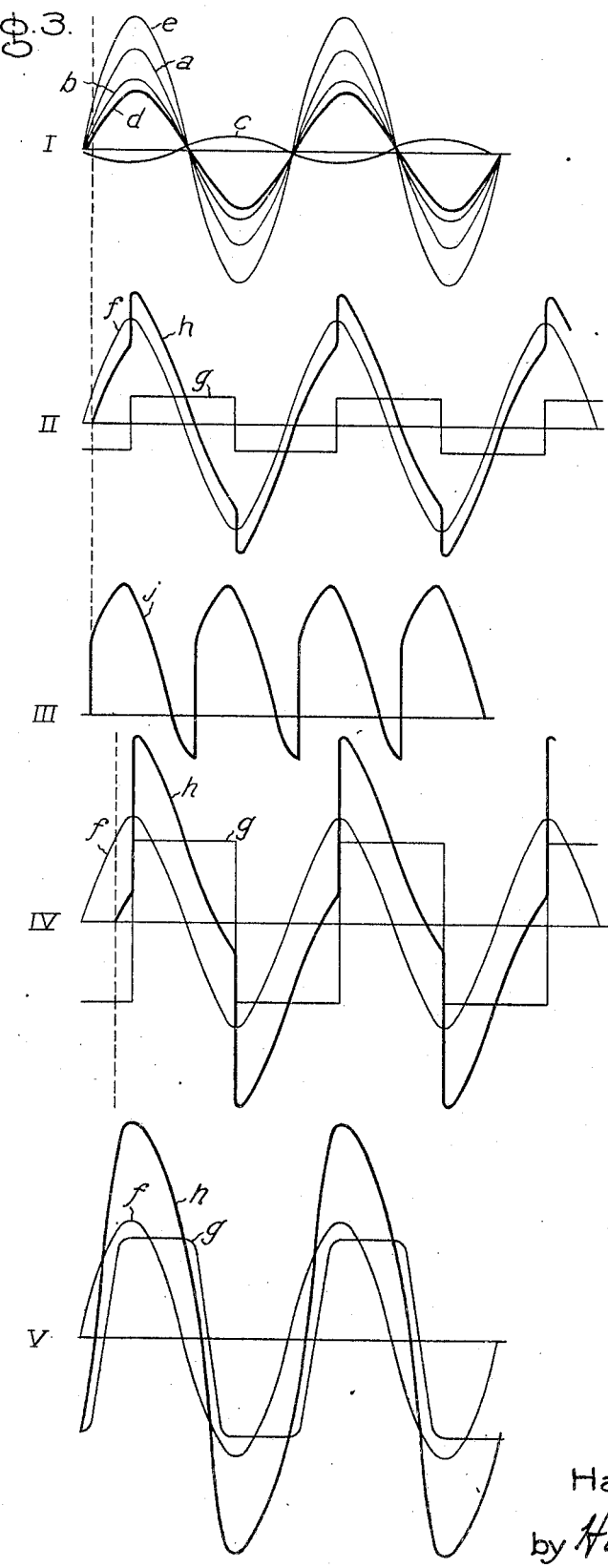

Patented June 29, 1937

2,085,596

UNITED STATES PATENT OFFICE 2,085,596

ELECTRIC CONTROL SYSTEM

Harold W. Lord, Schenectady, N. Y., assignor to General Electric Company, a corporation of New York Application January 2, 1936, Serial No. 57,190

8 Claims. (Cl. 172—238)

My invention relates to electric control circuits and more particularly to phase shifting circuits for providing control potentials which vary in different manners within different predetermined ranges of an electrical quantity.

It is frequently desirable in electric control circuits to provide control potentials which vary in phase displacement within different predetermined ranges of an electrical quantity. For example, in electric control circuits for electrical apparatus, such as dynamo-electric machines, variable impedance devices and electric valves, there has been evidenced a need for apparatus to provide a control potential which has a predetermined phase displacement within a predetermined range of an electrical condition of the apparatus and which has a different predetermined phase relation within a different predetermined range of the electrical condition. It is necessary in many instances to control a predetermined electrical or operating characteristic of electric apparatus of this nature when the voltage of an associated circuit is subjected to widely varying conditions. For example, in synchronous dynamo-electric machines under some conditions of operation it is desirable to control the field excitation in a predetermined manner when the voltage of a supply circuit varies within one predetermined range and to control the field excitation in a different manner when the voltage of the supply circuit varies within another range of voltages. There are also applications in electric valve translating circuits requiring control of an output characteristic of the valve circuit in response to variations in electrical conditions of a supply circuit for the valves or consumption apparatus.

An object of my invention is to provide a new and improved phase shifting circuit.

Another object of my invention is to provide a new and improved phase shifting circuit whereby a control potential is provided which has a predetermined phase displacement within one range of an electrical condition and which has other predetermined phase displacements for different ranges of the electrical condition.

A further object of my invention is to provide a new and improved means for obtaining a periodic control potential which varies in phase displacement in a predetermined manner within a predetermined range of the electrical condition and which varies in phase displacement in a different manner within a different predetermined range of the electrical condition.

A still further object of my invention is to provide a new and improved phase shifting circuit for obtaining a periodic control potential which is retarded in phase displacement relative to an electrical quantity within a predetermined range of the electrical quantity and which is advanced in phase relative to the electrical quantity within a different range of the electrical quantity.

In accordance with the illustrated embodiment of my invention, I provide an electrical control system which is susceptible of varied and modified application where it is desired to provide constant or varying output characteristics of electrical apparatus under varying operating conditions. By means of an excitation circuit comprising a non-linear resonant circuit and a source of alternating potential, I provide a resultant periodic potential which has predetermined different phase displacements relative to an electrical condition for predetermined different ranges of the electrical condition. In the specific embodiment illustrated, a non-linear resonant circuit of the series type is energized from an alternating current circuit, the voltage of which is to be controlled. The voltage appearing across a capacitance in the non-linear resonant circuit is combined with a voltage which varies in accordance with the voltage of the electric circuit to provide a resultant periodic potential having predetermined variable phase displacements for different predetermined ranges of voltages of the alternating current circuit. More specifically, in the embodiment illustrated, the field winding of an alternating current dynamo-electric machine of the synchronous type is energized from an alternating current circuit through electric valve translating apparatus in accordance with the voltage of the alternating current circuit. The above described excitation circuit is employed to control the conductivity of the electric valves of the translating circuit to obtain a desired output or operating characteristic of the dynamo-electric machine. By the proper design of the excitation circuit including the non-linear resonant circuit, the energization of the field winding and hence the operating characteristics of the dynamo-electric machine may be controlled in different predetermined manners for different predetermined ranges of the voltage of the alternating current supply circuit.

The control system relating to the control of electric valve translating apparatus is disclosed and broadly claimed in my copending divisional application Serial No. 89,597, filed July 8, 1936, and assigned to the assignee of the present application; and the control system relating to the control of dynamo-electric machines is disclosed and broadly claimed in my copending divisional application Serial No. 89,598, filed July 8, 1936, and assigned to the assignee of the present application.

For a better understanding of my invention reference may be had to the following description taken in connection with the accompanying drawings, and its scope will be pointed out in the appended claims.

Figure 2:
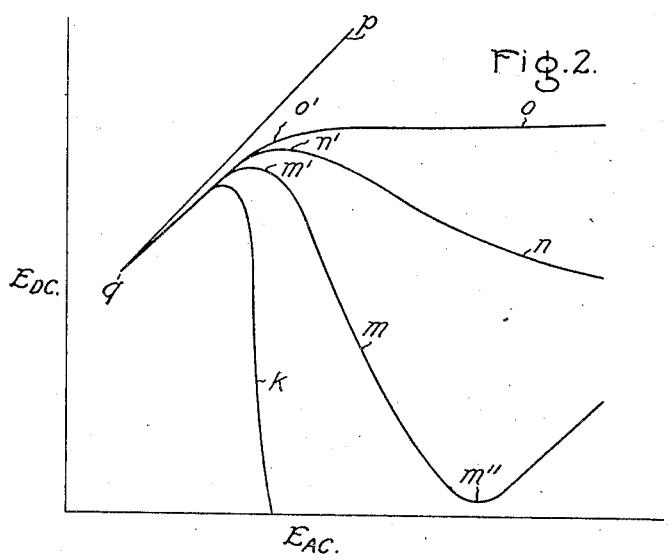

In the drawings, Fig. 1 represents diagrammatically an embodiment of my invention as applied to an electric valve circuit for energizing the field circuit of a dynamo-electric machine; while Fig. 2 represents certain operating characteristics of apparatus embodying my invention. Diagrams I to V of Fig. 3 also represent certain operating characteristics of the apparatus diagrammatically shown in Fig. 1.

Referring now to Fig. 1 of the drawings, my invention is diagrammatically shown as applied to an electric valve circuit 1 for supplying direct current to a field winding 3 of a dynamo-electric machine 2, having a three-phase stator winding 4. The electric valve circuit 1 and the stator winding 4 are energized from a three-phase alternating current circuit 5. The electric valve translating circuit 1 may comprise any suitable valve aggregate for transmitting energy to the field circuit 3 and I have shown by way of example a pair of electric valves 6 and 7, preferably of the vapor electric type, having anodes 8, cathodes 9 and control electrodes 10. A transformer 11, having a secondary winding 12 and an electrical mid-tap 12', is energized from the alternating current circuit 5 through conductors 13, and is employed to connect the valves 6 and 7 for full wave rectification. The field winding 3 of machine 2 is connected to the electric valve circuit 1 by means of conductors 14.

To provide means for controlling the conductivity of electric valves 6 and 7, I provide an excitation circuit 15 which responds to an electrical condition of the alternating current circuit 5, to control the voltage impressed upon the respective control electrodes 10 of valves 6 and 7. The excitation circuit 15 may be arranged to control the electric valve circuit 1 in a manner to provide a predetermined operating characteristic over a certain range of voltage of the circuit 5 and to provide a different operating characteristic over a different range of voltages. The excitation circuit 15 comprises a non-linear resonant circuit of the series type employing a capacitance 16, and self-saturating inductance or reactor 17 and an adjustable resistance 18 having a movable tap or contact 19. Conductors 20 are employed to connect the non-linear series circuit to one phase of the alternating current circuit 5. A transformer 21 having a primary winding 22 and a secondary winding 23 and energized from the alternating current circuit 5 by conductors 24 is employed to furnish a sinusoidal voltage with which an electrical quantity of the non-linear circuit is combined to control the conductivity of valves 6 and 7. The resultant of the voltage appearing across capacitance 16 and the voltage appearing across winding 23 of transformer 21 is impressed upon primary winding 26 of transformer 25 by means of conductors 28 and 29. The terminals of the secondary winding 27 are connected to the control electrodes 10 of electric valves 6 and 7 through conductors 30 and self-biasing circuits each comprising a current limiting resistance 31 and a capacitance 32. A mid-point 27' of secondary winding 27 is connected to the cathodes 9 of electric valves 6 and 7 by means of a conductor 33.

Although my invention is represented as being applied to a system for energizing the field winding of a dynamo-electric machine, it should be understood that it may be applied to electric circuits generally.

The operation of the embodiment of my invention diagrammatically shown in Fig. 1 may be best explained by considering the arrangement when unidirectional current is being supplied to the field winding 3 of the dynamo-electric machine 2 from alternating current circuit 5 by means of electric valves 6 and 7 and the associated transformer 11. If it be assumed that the voltage of circuit 5 is less than the voltage at which the non-linear circuit resonates, the arrangement will function as a bi-phase rectifier, and there will be substantial phase coincidence between the voltages impressed on the control electrodes 10 and the voltages impressed on valves 6 and 7. As will be understood by those skilled in the art, if there is substantial phase coincidence between the voltages impressed upon the control electrodes 10 and the voltages impressed between the respective anodes 8 and the cathodes 9, the average current conducted by the valves will be maximum and the direct current voltage will be maximum. As the phase of the voltage impressed upon the control electrodes 10 is retarded relative to the voltage impressed between the anodes 8 and cathodes 9 of the electric valves 6 and 7, the average current conducted by the valves will be decreased to effect a decrease in voltage of the direct current circuit 14.

In the particular arrangement of my invention shown in Fig. 1, the electric valve circuit 1 is arranged so that upon decrease in the voltage of the alternating current circuit 5, the voltage of the direct current circuit 14 may be maintained constant or may be increased or decreased. If it is desired to obtain an increase in the voltage of the direct current circuit 14 upon decrease in the voltage of alternating current circuit 5, the excitation circuit 15 is arranged so that during a normal range of voltage of the alternating current circuit 5 the voltages impressed upon the control electrodes 10 of electric valves 6 and 7 lag the voltages impressed between the respective anodes and the cathodes by an appreciable angle or phase displacement. This phase relationship is accomplished by selecting the constants of the non-linear circuit so that for operation above a predetermined range of voltages of the alternating current circuit 5 the excitation circuit 15 effects a retardation in the phase of the voltages impressed on the control electrodes 10. The critical resonance voltage of the non-linear circuit is chosen relative to the voltage of circuit 5 so that as the voltage of circuit 5 decreases, the phase of the potentials impressed upon the control members 10 is advanced to increase the average current conducted by the valves, effecting thereby a net increase in the voltage of direct current circuit 14.

The operation of the excitation circuit 15 may be best explained by considering the diagrams of Fig. 3 of the drawings. Referring to Diagram I, the curve $a$ represents the anode-cathode voltage impressed upon one of the electric valves, for example, electric valve 6. This voltage is considerably less than the critical resonance voltage of the non-linear circuit of excitation circuit 15. The curve b represents the voltage appearing across the secondary winding 23 of transformer 21 and the curve c represents the voltage appearing across the capacitance 16, while the curve d represents the resultant voltage impressed upon the primary winding 26 of transformer 25. During operation below the critical resonance voltage, it will be apparent that the voltage appearing across the capacitance 16, and represented by curve c, is relatively small compared with the other voltages existing in the excitation circuit 15 and that the capacitance voltage lags the voltage of circuit 5 by substantially 180 electrical degrees. However, as the voltage of alternating current circuit 5 approaches the critical resonance voltage of the non-linear circuit, represented by the curve e of Diagram I, the voltage of capacitance 16 is increased in magnitude and advanced in phase to effect a retardation of the voltage impressed upon the control electrode 10.

Diagram II represents certain voltages in the excitation circuit as the voltage of the alternating current 5 approaches the resonance voltage. Curve f of Diagram II represents the voltage now appearing across the secondary winding 23 of transformer 21 and curve g represents the voltage appearing across the capacitance 16, while curve h represents the resultant voltage impressed upon the primary winding 26 of transformer 25. It will be understood that as the voltage of the alternating current circuit 5 approaches the critical resonance voltage, the resultant voltage, represented by curve h, impressed upon the primary winding 26 of transformer 25 is retarded in phase relative to the voltage of the alternating current circuit 5, and hence effects a retardation in phase of the voltage impressed upon the control electrodes 10 of electric valves 6 and 7 relative to the anode-cathode potentials of these valves. Under the conditions of operation represented by the curves of Diagram I, since there is substantial phase coincidence between the voltages impressed upon the control electrodes 10 of electric valves 6 and 7 and the voltages impressed upon the electric valves, the output voltage will be maximum for a certain impressed voltage. However, under the conditions of operation represented by the curves of Diagram II, since the voltages impressed upon the control electrodes 10 have been retarded in phase relative to the voltages impressed between the anodes and cathodes, the average current conducted by the electric valves will be substantially less than the average current conducted under the conditions of operation represented in Diagram I. The voltage impressed upon the direct current circuit 14 by the electric valves 6 and 7 under the operating conditions represented by the curves of Diagram II, that is, when the voltages impressed upon the control electrodes 10 lag the voltages impressed upon the electric valves 6 and 7 by the transformer 11, is represented by the curve j of Diagram III. It should be understood that curve j represents the voltage of circuit 14 when there is appreciable inductance in the circuit.

The curves of Diagram IV represent the circuit voltages appearing in the excitation circuit 15 and the phase displacement obtainable by using different constants for the elements 16, 17, and 18 to obtain a greater phase displacement than that shown in Diagram II. It will be understood that by a proper choice of constants for the non-linear circuit comprising capacitance 16, self-saturating inductance 17 and resistance 18, it is possible to control the range of phase displacement obtainable between the voltages impressed upon the control electrodes 10 of electric valves 6 and 7 and the voltages impressed between the anodes 8 and the cathodes 9 of these valves, and hence to obtain a considerable variation in the control of the voltage of direct current circuit 14.

Diagram V represents the voltages appearing in the excitation circuit 15 when the voltage of circuit 5 is increased beyond the critical resonance voltage region where the resistance 18 has a suitable value; curve f represents the voltage appearing across the secondary winding 23 of transformer 21, curve g represents the voltage appearing across the capacitance 16, and curve h represents the resultant voltage impressed upon the primary winding 26 of transformer 25. It will be noted that the voltage of capacitance 16 is advanced in phase relative to the voltage of transformer winding 23 and is increased in magnitude to effect a decrease in phase displacement between the voltage h impressed upon primary winding 26 of transformer 25 and the voltage of the circuit 5 as the latter voltage increases beyond the region of the critical resonance voltage.

In Fig. 2 of the drawings there are shown curves representing the variation in the voltage of the direct current circuit 14 as a function of the voltage of alternating current circuit 5 for various values of the resistance 18 where the load circuit 14 comprises inductance. Curves k, m, n and o represent the relation between the voltage of direct current circuit 14 and the voltage of alternating current circuit 5 for different values for the resistance 18, of increasing value in the order named, while curve p is merely a reference line. By the choice of values for resistance 18 relative to the voltage of the alternating current supply circuit 5 and the values of capacitance 16 and inductance 17, it is possible to obtain a variety of operating characteristics for the apparatus employed. For example, with a relatively high value of resistance for the element 18, represented by curve o of Fig. 2, it is possible to obtain a substantially constant voltage in circuit 14 for voltages in circuit 5 above a predetermined value. From the point q to the point o' on curve o, the increase in the direct current voltage is effected by the increase in the voltage impressed upon the electric valves 6 and 7. During this range of voltages the circuit is operating below the critical resonance voltage region and as a result thereof there is substantial phase coincidence between the potentials impressed upon the control electrodes 10 and the potentials impressed between the anodes 8 and the cathodes 9 of electric valves 6 and 7. At the voltage represented by point o' of the curve o, the voltage of the alternating current circuit 5 approaches the critical resonance voltage region for the excitation circuit 15 and effects thereby a retardation in the phase of the voltage impressed upon the control electrodes 10. Upon further increase in the voltage of the alternating current circuit 5, there is effected a further retardation in the voltage impressed upon the control electrodes to maintain a substantially constant voltage of the direct current circuit 14 represented by the portion of curve o beyond o'. By choosing a smaller value of resistance for the element 18, it is possible to obtain operating characteristics represented by the curves k, m and n.

The operating characteristic represented by curve m of Fig. 2 is of particular interest since it shows a substantially linear increase in value of the direct current voltage for increases in the alternating current voltage between the points $q$ and $m'$. Upon further increase in the alternating current voltage into the region of the critical resonance voltage of the excitation circuit 15, represented by the curves of Diagram IV of Fig. 3, there is effected a retardation in the phase displacement of the resultant excitation circuit voltage $h$ relative to the voltage $a$ of the alternating current circuit 5 to effect a decrease in the voltage of direct current circuit 14 represented by the portion of the curve between points $m'$ and $m''$. For voltages greater than the voltage corresponding to the point $m''$ there is effected a progressive advancement in the phase of the voltages impressed upon the control electrodes 10 relative to the voltages impressed upon electric valves 6 and 7, which increases the average current conducted by electric valves 6 and 7 to increase the voltage of the direct current circuit 14. The phase relationships of the voltages appearing in excitation circuit 15 within the range of voltages represented by $m'$ and $m''$ of curve $m$, are represented in Diagram IV of Fig. 3, while the phase relationships for voltages of circuit 5 having a greater value than that represented by point $m''$ on curve $m$ are shown in Diagram V.

If the constants of the excitation circuit 15 are chosen to obtain an operating characteristic as represented by the curve $n$ of Fig. 2, the electric valve circuit 1 may be made to operate to control the energization of the field winding 3 of the dynamo-electric machine 2 to maintain a predetermined pull-out torque under varying voltage conditions of circuit 5. If the excitation circuit 15 is designed to operate in the region beyond $n'$ on curve $n$, the excitation circuit will effect an increase in the voltage impressed upon direct current circuit 14 as the voltage of alternating current circuit decreases. In this manner, as the voltage of the alternating current circuit is decreased, the energization of the field winding 3 will be increased to maintain a predetermined minimum pull-out torque. Of course, to obtain this characteristic the voltage of the alternating current circuit 5 must be in the region of the critical resonance voltage of the non-linear circuit of excitation circuit 15. The rates at which the energization of the field winding 3 is varied in response to variations in the voltage of the alternating current circuit 5 may be controlled by choosing various different values for the resistance 18.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:—

1. In combination, an alternating current circuit, a non-linear resonant circuit being connected to said alternating current circuit, means for deriving a component of voltage from said alternating current circuit, and means responsive to a resultant of an electrical quantity of said non-linear circuit and said component of voltage for producing a voltage having a predetermined phase relation with the voltage of said alternating current circuit over a predetermined range of voltages applied to said non-linear circuit and a different predetermined phase relation over a different range of voltages applied to said non-linear circuit.

2. In combination, an alternating current circuit, means comprising a non-linear resonant circuit and a source of alternating voltage, and means responsive to a resultant of an electrical quantity of said non-linear circuit and to said alternating voltage for obtaining a periodic potential having a substantially constant phase displacement relative to the voltage of said alternating current circuit within a predetermined range of voltages and for effecting a retardation in the phase of said periodic potential for values of voltage beyond said range.

3. In combination, an alternating current circuit, means comprising a source of alternating voltage and a non-linear resonant circuit, and means responsive to the resultant of an electrical quantity of said non-linear circuit and said alternating voltage for obtaining a periodic voltage having a substantially constant phase displacement relative to the voltage of said alternating current circuit within a predetermined range of voltages of said alternating current circuit and for effecting retardation in the phase of said periodic voltage for voltages within a predetermined range above said first-mentioned range and an advancement in the phase of said periodic voltage within a third range of voltages above said second-mentioned range of voltages.

4. In combination, an alternating current circuit, a non-linear resonant circuit connected to said alternating current circuit, means for deriving a component of voltage from said alternating current circuit, and means responsive to a resultant of an electrical quantity of said non-linear circuit and said component of voltage for producing a voltage having different predetermined phase relationships with the voltage of said alternating current circuit within different predetermined ranges of voltages of said alternating current circuit.

5. In combination, an alternating current circuit, means comprising a non-linear resonant circuit energized from said circuit, a source of alternating potential, and means responsive to a resultant of an electrical quantity of said non-linear circuit and said alternating voltage for obtaining a periodic voltage which is progressively retarded in phase relative to the voltage of said alternating current circuit within a predetermined range of voltages of said alternating current circuit and which is progressively advanced in phase within a different predetermined range of voltages of said alternating current circuit.

6. In combination, an alternating current circuit, means energized from said circuit comprising a non-linear resonant circuit including a serially connected resistance, a saturable inductance and a capacitance, a source of alternating voltage, means responsive to the resultant of the voltage appearing across said capacitance and the voltage of said source for producing a periodic voltage having different predetermined phase displacements relative to the voltage of said alternating current circuit within different predetermined ranges of voltages of said alternating current circuit.

7. In combination, an alternating current circuit, a non-linear resonant circuit energized from said circuit and comprising a serially connected resistance, a saturable inductance and a capacitance, a source of alternating voltage, and means responsive to a resultant of the voltage of said source and the voltage of said capacitance for providing a periodic voltage having a substantially constant phase displacement relative to the voltage of said alternating current circuit within a predetermined range of voltages of said alternating current circuit and for effecting a progressive retardation in phase of said periodic voltage for values of voltage beyond said range.

8. In combination, an alternating current circuit, a non-linear resonant circuit energized from said circuit and comprising a serially connected resistance, a saturable inductance and a capacitance, a source of alternating voltage, and means responsive to the resultant of the voltage of said source and the voltage appearing across said capacitance for obtaining a periodic voltage having a substantially constant phase displacement relative to the voltage of said alternating current circuit within a predetermined range of voltages of said alternating current circuit and for effecting a progressive retardation in the phase of said periodic voltage within a range above said first-mentioned range and for effecting a progressive advancement in phase of said periodic voltage within a third range of voltages above said second-mentioned range of voltages.

HAROLD W. LORD.